(12) United States Patent
Weissenfluh

(10) Patent No.: US 11,105,419 B2
(45) Date of Patent: Aug. 31, 2021

(54) TRANSMISSION TORQUE CONVERTER

(71) Applicant: Goerend Transmission, Inc., Saint Lucas, IA (US)

(72) Inventor: James W. Weissenfluh, Waucoma, IA (US)

(73) Assignee: Goerend Transmission, Inc., Saint Lucas, IA (US)

( * ) Notice: Subject to any disclaimer, the term of this patent is extended or adjusted under 35 U.S.C. 154(b) by 28 days.

(21) Appl. No.: 16/516,129

(22) Filed: Jul. 18, 2019

(65) Prior Publication Data

US 2020/0025291 A1    Jan. 23, 2020

Related U.S. Application Data

(60) Provisional application No. 62/700,098, filed on Jul. 18, 2018.

(51) Int. Cl.
*F16H 61/14* (2006.01)
*F16K 15/04* (2006.01)
*F16H 45/02* (2006.01)

(52) U.S. Cl.
CPC .......... *F16H 61/142* (2013.01); *F16H 45/02* (2013.01); *F16K 15/04* (2013.01)

(58) Field of Classification Search
CPC ........ F16H 61/142; F16H 54/02; F16H 61/14; F16H 2045/0215; F16H 57/0435; F16K 15/04; F16K 15/00; F16K 47/04; F16K 15/01; F16K 1/14; F15B 13/024; F15B 13/025; F15B 13/026; F15B 13/027; F15B 2211/40553; F15B 2211/50518
See application file for complete search history.

(56) References Cited

U.S. PATENT DOCUMENTS

| | | | |
|---|---|---|---|
| 6,996,978 B2 | 2/2006 | Goerend | |
| 8,733,528 B1 | 5/2014 | Goerend | |
| 8,776,757 B2 | 7/2014 | Goerend | |
| 9,334,946 B1* | 5/2016 | Mason | F16K 11/0716 |
| 9,625,022 B2 | 4/2017 | Goerend | |
| 9,976,642 B2 | 5/2018 | Goerend | |
| 2009/0105020 A1* | 4/2009 | Shioiri | F16H 61/66272 |
| | | | 474/28 |
| 2009/0301588 A1* | 12/2009 | Shimizu | F16K 31/0613 |
| | | | 137/625.64 |
| 2013/0306166 A1* | 11/2013 | Erb | F02M 63/005 |
| | | | 137/469 |
| 2018/0347692 A1 | 12/2018 | Goerend | |

OTHER PUBLICATIONS

Automatic Transmission-45RFE/545RFE. Chrysler Corporation, pp. 21-454 through 21-463, (2004) (Year: 2004).*

* cited by examiner

*Primary Examiner* — Charles A Fox
*Assistant Examiner* — Jessica L Burkman
(74) *Attorney, Agent, or Firm* — McKee, Voorhees & Sease, PLC

(57) ABSTRACT

A valve body for an automotive transmission includes a pressure regulator valve in the casting for controlling oil pressure within the torque converter. The valve has a bore to provide fluid communication with an exhaust circuitry in the transmission when the valve is moved by oil pressure from a first position to a second position. The regulator valve prevents excessive pressure and damage from ballooning of the torque converter housing. In an alternative non-lockup torque converter, a check ball in a modified separator plate moves to open and close an oil path in the plate to thereby control oil pressure.

9 Claims, 21 Drawing Sheets

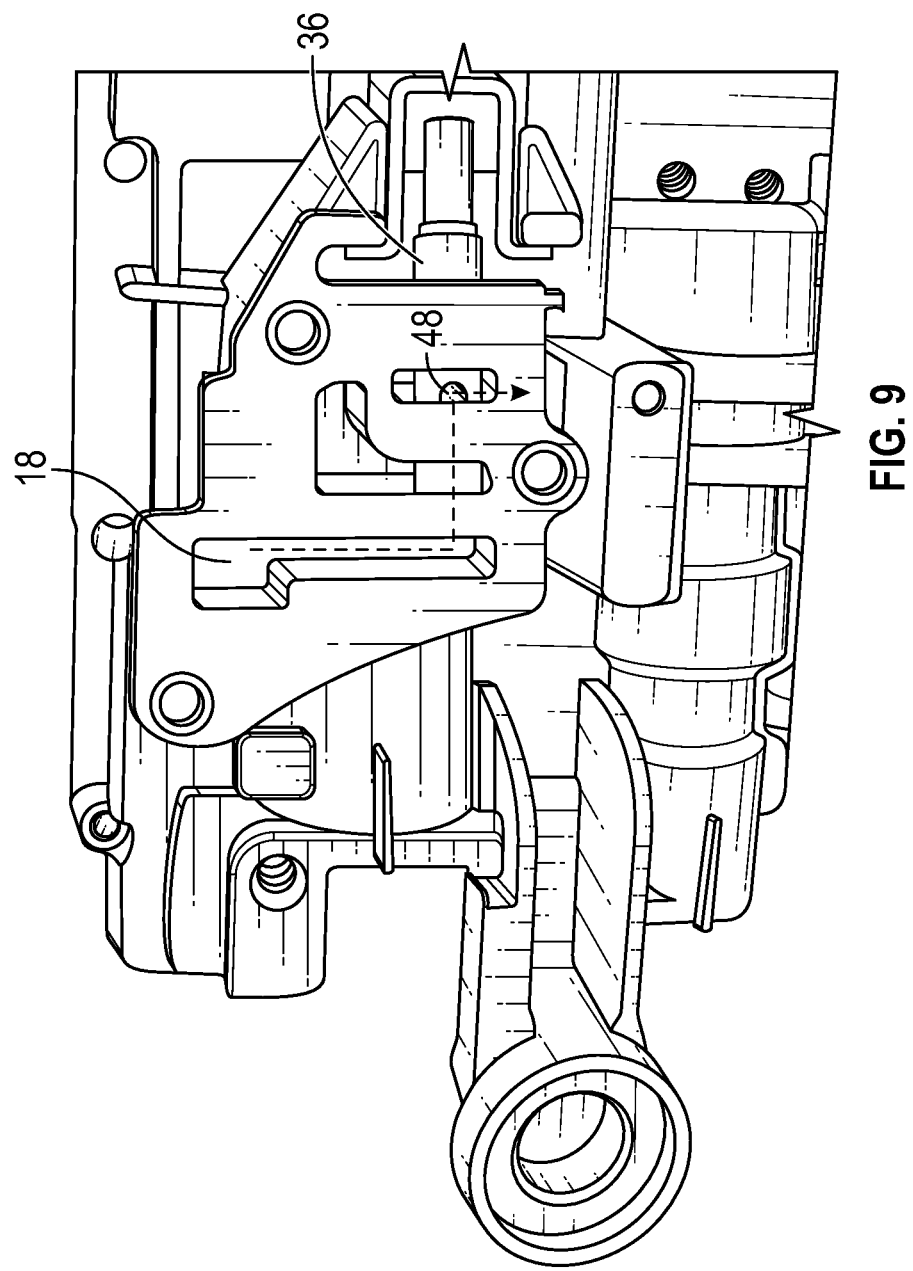

ically includes a main pressure regulator valve 1, a
TRANSMISSION TORQUE CONVERTER

CROSS-REFERENCE TO RELATED APPLICATIONS

This application claims priority under 35 U.S.C. § 119 to provisional application Ser. No. 62/700,098, filed Jul. 18, 2018, herein incorporated by reference in its entirety.

BACKGROUND OF THE INVENTION

Some rear wheel drive transmissions utilized in passenger vehicles are equipped with a torque converter that links the engine rotation to the transmission input shaft by reversing the oil flow through the torque converter, transmission shaft, and valve body, thus applying the clutch within the torque converter.

In a conventional automatic transmission for an automotive vehicle, the torque converter and impeller are driven by engine rotation. The impeller hub 19 (FIG. 1) drives the transmission oil pump gear rotors (not shown), thereby creating transmission oil flow from the sump (not shown). There are torque converters with and without lockup clutch assemblies.

Both non-lock and lockup torque converters operate the same way as the vehicle begins to take off from a stopped position. The impeller or pump 27 spins with the engine and drives the oil inside the torque converter assembly towards the turbine 28. This driven oil transfers power to the turbine which also starts to rotate. The turbine is connected to the transmission input shaft 23 which then goes through the gear train of the transmission to drive the wheels of the vehicle. As wheel speed increases, the turbine gets closer to reaching the same speed as the impeller/engine. But the turbine never fully matches impeller speed due to power losses in the driven fluid. This is the extent of the operation of a non-lock torque converter. Imagine two desk fans pointed at each other, fan A (the impeller) is on and moving air, while fan B (the turbine) is off. Eventually the air from fan A will start to rotate fan B faster and faster.

The lockup torque converter operates the same way and has the same components as the non-lock, with the addition of a lockup clutch piston 21. The function of the lockup clutch is to mechanically connect the turbine/transmission input shaft directly to impeller/engine rotation for 100% efficient input to output RPM. Under normal driving conditions lockup is only used at cruising speeds, for improved fuel mileage, etc.

FIGS. 7A or 11A and 7B or 12A show the oil circuitry for the transmission and torque converter with a lock up clutch with the clutch locked 7A or 11A and unlocked 7B or 12A. This circuitry includes a main pressure regulator valve 1, a switch valve 7 and a boost valve 33 which control flow fluid within the circuitry. The main pressure regulator valve 1 is mounted on a compression spring 2, so as to hold the valve in a bore of the transmission casting. As the oil pump creates fluid flow, the spring 2 holds the pressure regulating valve 1 down (to the left in FIG. 7A) so as to create pressure in the fluid lines. This pressure feeds the various oil circuits, including the regulator valve 1, the boost valve 33, and the switch valve 7. These valves are spring biased to a normal operating position and can be moved by increased oil pressure against the bias of the spring. Sometimes, the regulator valve spring is replaced with a stronger spring so as to increase the line pressure within the circuits of the transmission to the transmission clutches and bands. While the increased line pressure can reduce the time for the clutch to lock up in the torque converter, excessive pressure can balloon the torque converter walls.

Conventional factory pressure for a torque converter is 135 psi (maximum) when the clutch is unlocked, which may cause very slight ballooning, such as 0.050 inch. This level of deformation of the torque converter housing is acceptable, since the housing is somewhat resilient and will return or restore its original configuration after pressure reduces. However, at 200 psi, the ballooning increases to 0.10 inch, which is beyond the elasticity of the converter walls. This leads to excessive deformation, which causes damage. For example, the small tolerances between components results in a ballooned hub of the torque converter 19 (FIG. 1), which may push the pump gear into the housing, which destroys the housing. Ballooning may also cause the torque converter bearings to become dislodged. Since the internal torque converter oil pressure cannot be controlled, a stronger regulator valve spring can ruin the pump if the torque converter balloons excessively due to increased oil pressure.

More particularly, the pressure regulator valve 1 has various diameter lands that counteract the force of the pressure regulator spring 2. As pressure increases and exceeds the spring force, the valve 1 moves outward (right in FIG. 7B) against the spring until the line pressure cavity 4 (FIG. 3) is open to the sump 5, thereby causing the oil pressure to drop. The regulator valve 1 continually shuttles or reciprocates in this manner to regulate the main line oil pressure. The cavity 6 directly adjacent to the main pressure cavity 4 (FIG. 3) and opposite the sump opening 5 is the torque converter charge circuit 6, (also known as the lubrication circuit) which provides cooling and lubrication. Before the main line pressure cavity 4 builds sufficient pressure for release to the sump 5, the torque converter circuit 6 is open and fills with a restricted amount of line pressure, which is directed to the switch valve 7 (FIG. 2). The switch valve 7 includes four lands 8, 9, 10 and 11. The outboard land 8 is larger in diameter than the other lands, which are smaller and similar in diameter to one another. The center land 10 is also equipped with a step 12 that is 0.010" smaller in diameter than the main land 10. The switch valve 7 is held in its bore with a compression spring 20 (FIG. 2) when the torque converter clutch piston 21 (FIG. 1) is disengaged. The lubrication circuit 6 feeds the torque converter through the circuit 15 (FIG. 3) through the center port 22 of the input shaft 23, to fill the area 24 between the torque converter front cover 25 and the torque converter piston clutch 21, so as to hold the piston 21 in the released position, as indicated by arrow 26 in FIG. 1. This oil flows through the impeller 27 and turbine 28 to provide a fluid coupling and exits the torque converter 29 between the input shaft 23 and the stator support 30 via area 31 (FIG. 1). This oil then returns to circuit 17 (FIG. 3) and exits circuit 16 between the lands 10 and 11 of the switch valve 7, and then flows to the cooler. The oil pressure in the lubrication circuit 6 is regulated by this outermost land 8 in conjunction with land 10 and step 12 to partially close circuit 6 of the switch valve 7, and the spring 20 (FIG. 2). The switch valve 7 constantly shuttles, similar to the pressure regulating valve 1, so as to regulate the oil pressure, from the factory maximum 135 PSI.

When lockup of the torque converter is desired, a lock up solenoid 38 is activated, causing a lockup valve 39 to stroke and open an oil passage directing full line pressure to the cavity 18 (FIG. 3) and 7A) to stroke the switch valve 7 against the spring 20 until the switch valve contacts the stop 32. This action reverses the fluid flow inside the torque converter 29 by feeding the line pressure used to stroke the switch valve 7 into the torque converter through the oil passage 31 between the stator support 30 and the input shaft 23, while simultaneously opening the oil passage 15. This causes the oil in area 24 to exit the torque converter through passage 22 in the center of input shaft 23 to exhaust port 13 and 14, thereby forcing the torque converter clutch piston 21 into contact with the torque converter front cover 25. The piston 21 is splined to the turbine 28, which is splined to the input shaft 23. The front cover 25 is linked by bolt 49 to the flex plate 41 (FIG. 1), which in turn is linked to the engine crank shaft 40 by the bolts 50, to lock the engine rotation directly to the input shaft 23 of the transmission. The oil in the torque converter charge, (lubrication) cavity 6 is no longer regulated by the switch valve 7 and now flows directly to the transmission cooler and the lubrication circuits 16 (FIG. 3). A simultaneous action takes place as the lock up engagement or application oil pressure strokes the line pressure boost valve 33 (FIG. 4B), which opens an orifice 34 (FIG. 5), which lowers the pressure in the pressure reducing circuit 42 that resists the force of the spring 2 by acting on one of the lands of the pressure regulating valve 1, so as to cause the main line pressure to increase while lockup is applied.

The prior art line pressure boost valve 33 is a type of "switch" valve which means ON/OFF it only has 2 positions. It consists of two pieces and has two oil circuits acting to stroke this valve against its spring to the ON position for line pressure boost, one of these is lockup apply. The other, which is less important for this invention is overdrive (4th gear) which is not illustrated but would enter between the two pieces of the boost valve 33. If one or both of these are ON the boost valve is stroked ON, which positions the valley of the boost valve (which can be seen in FIGS. 4B and 4D) to open an oil passage 42 to exhaust 34. This oil passage 42 is connected to one of the lands of the main pressure regulator valve 1. The oil passage is connected internally within the casting and cannot be seen. Orifice 34 exhausts only some of the pressure in this circuit, so the size of the orifice 34 controls the amount the line pressure is "boosted". The larger the orifice, the higher the line pressure boost.

The above description is the conventional operation of the torque converter with a lockup clutch, which allows excessive pressure to build inside the torque converter when in the lockup mode, particularly if the regulating spring 2 is replaced with a stronger rate spring to increase the main line pressure for enhanced holding torque of the transmission bands and clutches. Such excessive pressure inside the torque converter can cause the torque converter to balloon, i.e., expand so as to increase the overall height dimension from the dashed line 43 in FIG. 1 to the dashed line 44, and thereby result in damage to the torque converter assembly 29 and the transmission oil pump.

Another disadvantage of increased line pressure is that switch valve 7 is contacting stop 32 (FIG. 2) with more force due to the increased pressure in circuit 18 (FIG. 3). This can cause stop 32 to break away from its bracket. When the stop 32 breaks, it causes improper torque converter flow control and can be detrimental to internal components.

Thus, there is a need for a system to regulate oil pressure to and from the torque converter to avoid damaging balloon effects by excessive pressure.

Therefore, a primary objective of the present invention is the provision of a new valve for the oil circuitry of a transmission torque converter having a lockup clutch (TCC) which allows the internal oil pressure to be regulated so as to avoid damage to the torque converter or the oil pump.

Another objective of the present invention is the provision of a regulating valve for an automotive transmission fluid circuit to control oil pressure in the torque converter.

A further objective of the present invention is the provision of a check ball or check valve to control oil pressure in a torque converter drain (dump valve).

These and other objectives will become apparent from the description of the invention.

These and/or other objects, features, and advantages of the disclosure will be apparent to those skilled in the art. The present invention is not to be limited to or by these objects, features and advantages. No single embodiment need provide each and every object, feature, or advantage.

BRIEF DESCRIPTION OF THE DRAWINGS

FIG. 9 shows Applicant's pressure regulating valve in the transmission casting, with the spring removed for clarity.

DETAILED DESCRIPTION OF THE INVENTION

Figure 3:
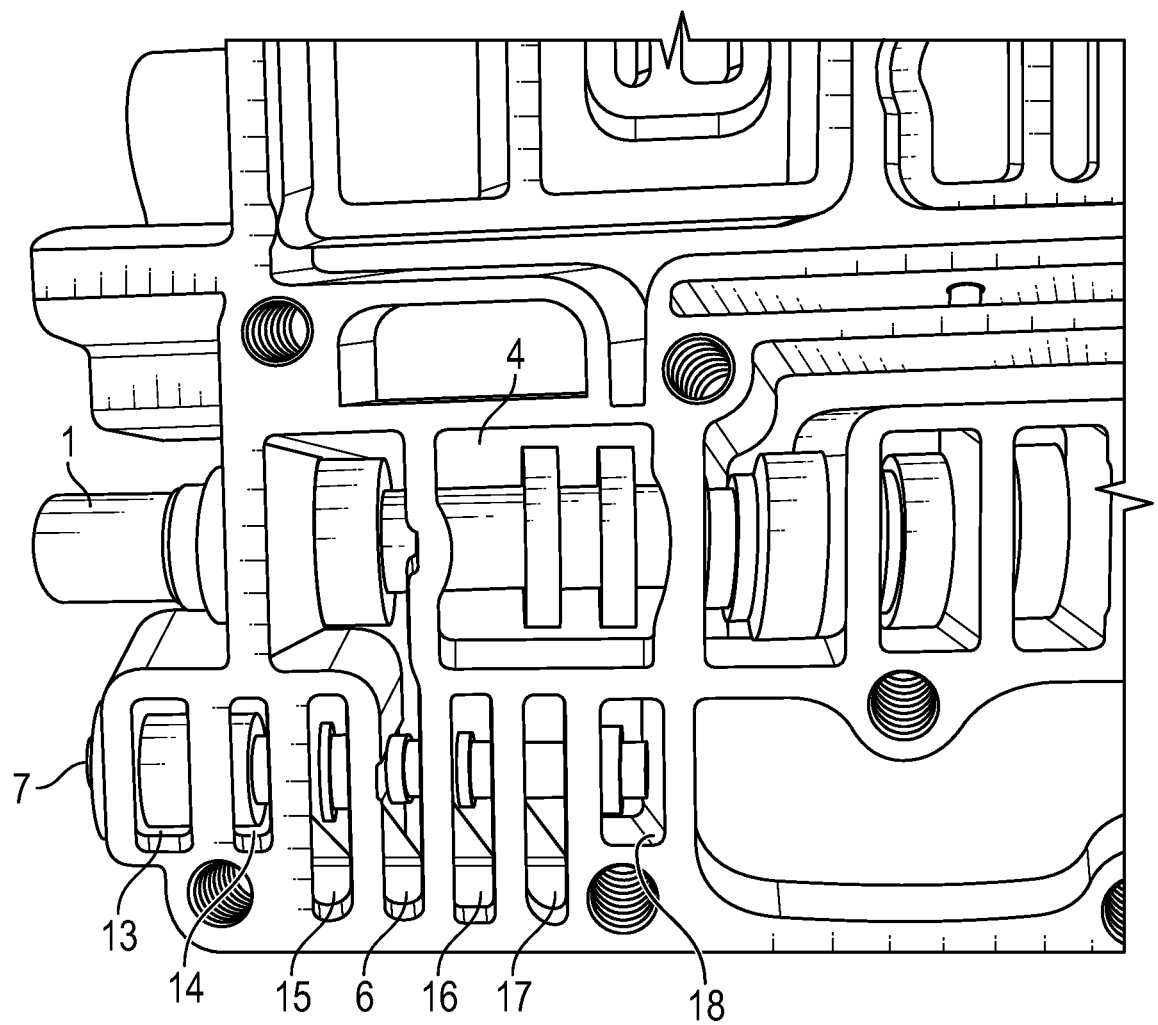
FIG. 3 shows a portion of the transmission casing with the conventional pressure regulating valve and switch valve therein.
Figure 6:
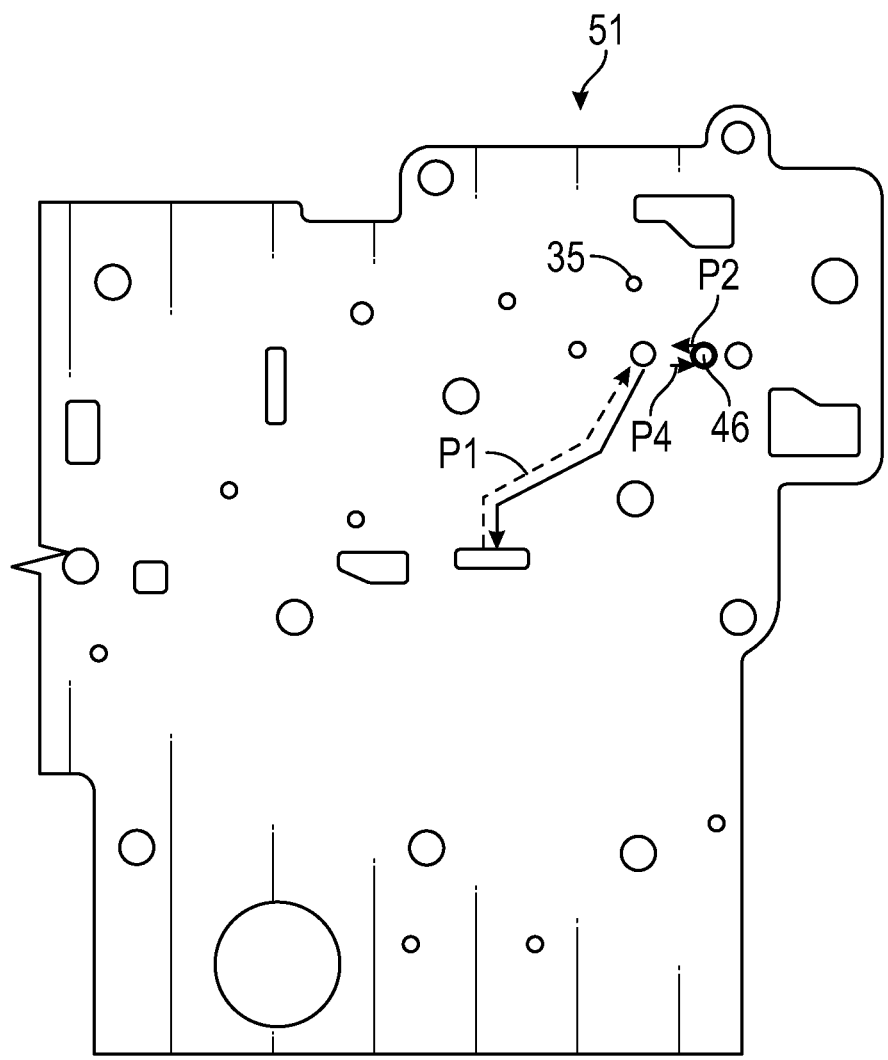
FIG. 6 shows a separator plate for the transmission, having applicant's new one-way check ball.
Figure 7A:
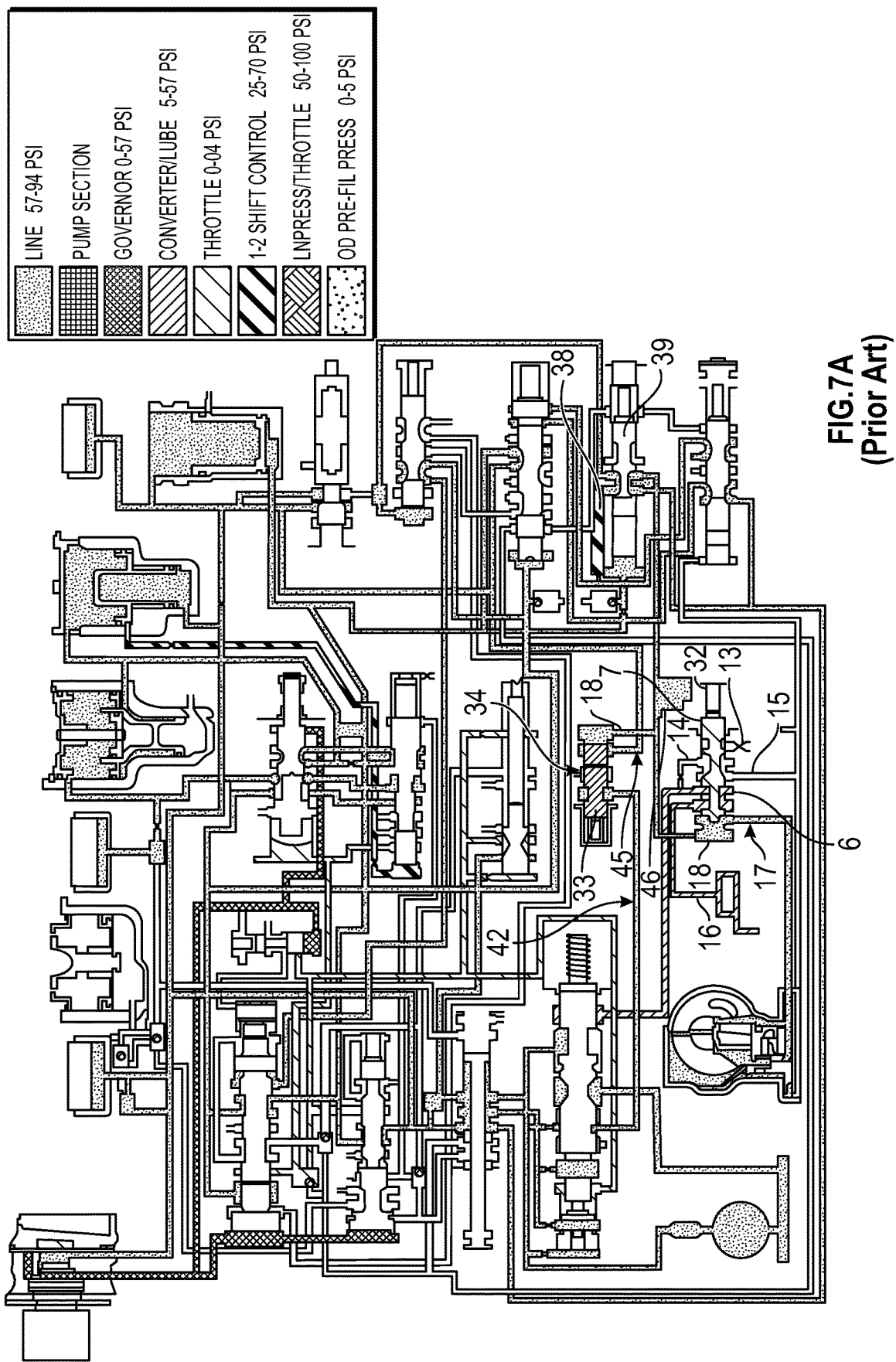
FIG. 7A is a schematic diagram of a prior art oil circuit for an automatic transmission having a torque converter with a lock up clutch, in a locked position.
Figure 7B:
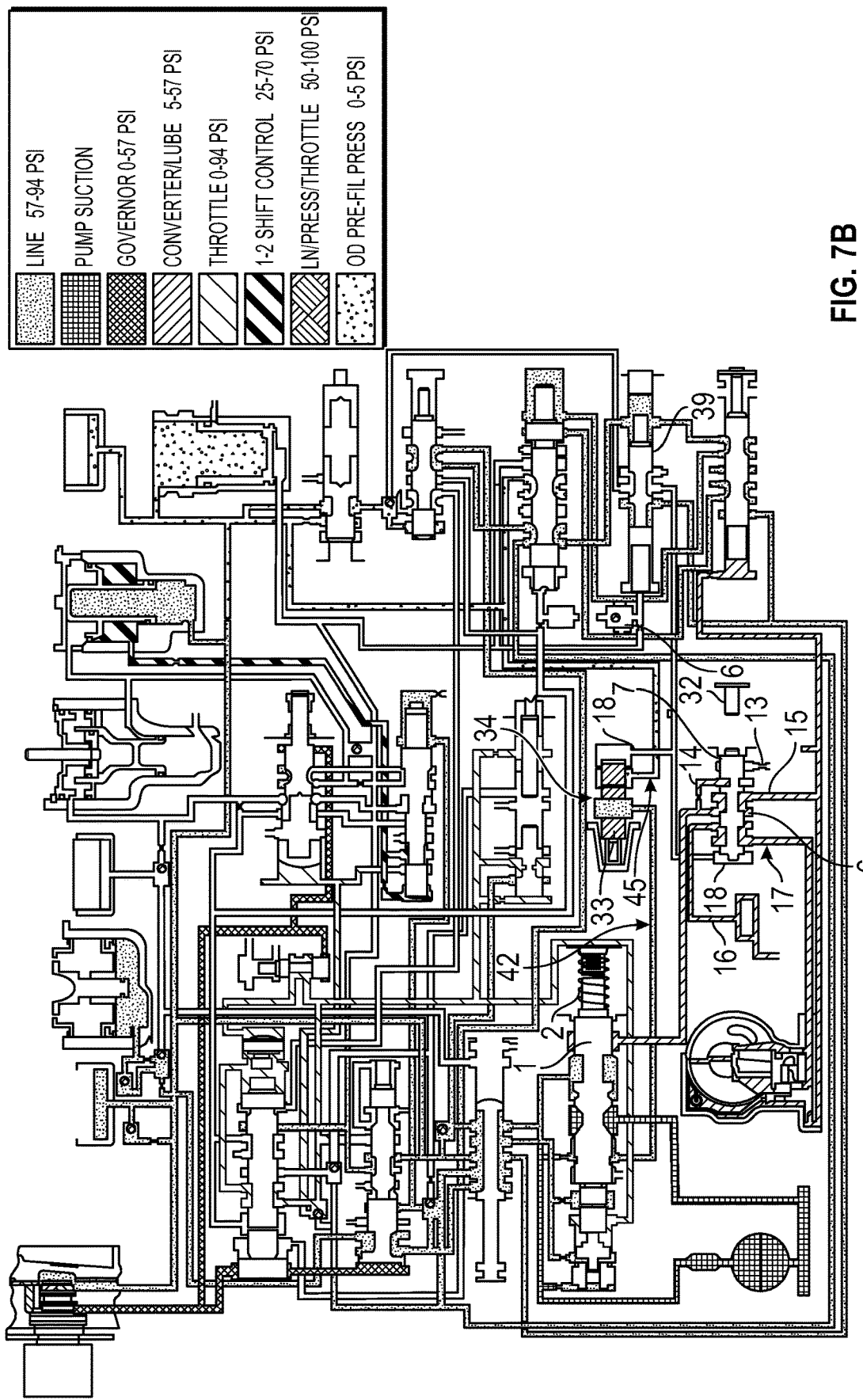
FIG. 7B is a schematic diagram of a prior art oil circuit for an automatic transmission having a torque converter with a lock up clutch, in an unlocked position.

In the present invention, a lock up apply regulator valve (TCAR) 36 replaces the pressure boost valve 33. The line pressure used to apply the lockup clutch piston 21 is fed through an orifice 35 (FIG. 8A) to the regulator valve 36, to isolate the pressure acting on the piston 21 from the main line pressure so it may be regulated to a lower pressure by the new system In the lockup apply oil circuit 17 (FIG. 3) while the TCC is in the locked position. A pressure reducing circuit 42 ((FIG. 7A) not present) is blocked by the regulator valve 36 and the circuit 45 is blocked with a new separator plate 51 (FIG. 6). The new plate 51 replaces the large "L" shaped lockup feed hole in the prior art separator plate with the orifice hole 35 and the check ball hole, and also blocks the overdrive feed 45 to the TCAR valve 36.

A check ball 46 (FIGS. 6 and 8A) provides a bypass around orifice 35 for a fast exhaust of the lockup apply circuit 17-18 when the torque converter lockup circuit is commanded to an off or disengaged position.

In FIG. 6, the broken lines P1 (extending upwardly to hole 35) and P2 (extending to the left from the check ball 46) indicates line pressure flows from the lock-up valve to the restriction orifice 35. The one-way check ball 46 is contained within the casting and blocks the large hole. The solid line arrows P3 (downwardly from orifice 35) and P4 (extending to the right towards the check ball 46) indicates the lock-up solenoid in a deactivated state, causing the lock-up valve to stroke down, thereby opening the TCC apply circuit to exhaust. The check ball 46 moves off its seat, allowing more flow to exhaust. The prior art separator plate 51 also allows line pressure to boost while in overdrive. The prior art oil passage 45 (FIG. 7A) to the boost valve 33 from the overdrive circuit has been eliminated in the new separator plate 51.

In the conventional separator plate, the hole 35 and the check ball 46 do not exist, and there is unrestricted oil flow from the lockup valve 39 to the bottom of the switch valve 7.

In the present invention, the valve 36 replaces the line pressure boost valve 33 of the conventional system, along with a spring 37, which together act as a pressure regulator valve to the lockup apply oil circuit 17-18, without affecting the mainline pressure and while keeping the torque converter pressure at a safe level without ballooning damage.

Figure 4A:
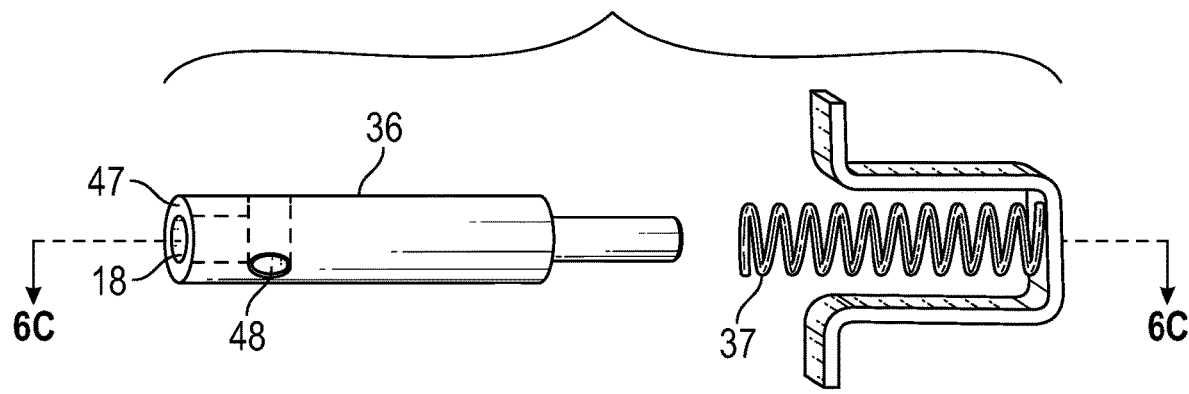
FIG. 4A is a side elevation view of the present invention.
Figure 4B:
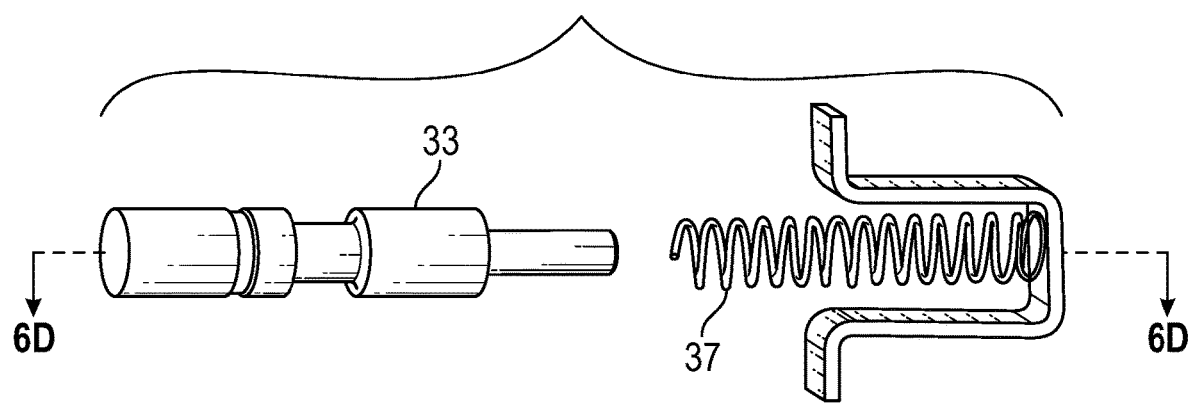
FIG. 4B is a side elevation view of showing a prior art boost valve pressure regulating valve of the present invention.
Figure 4C:
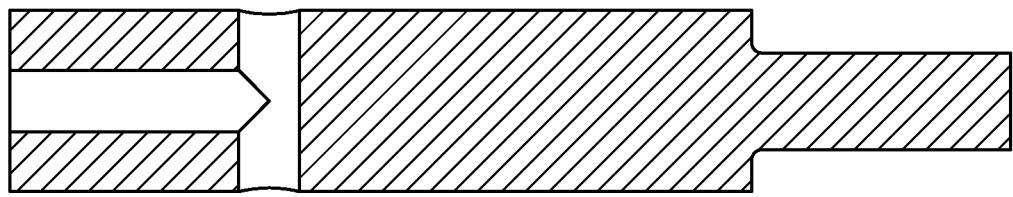
FIG. 4C is a sectional view of the pressure regulating valve of the invention of FIG. 4A.
Figure 4D:
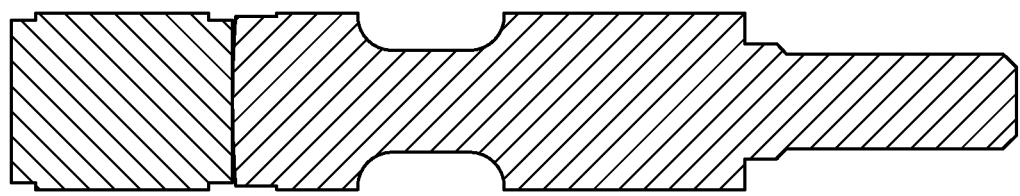
FIG. 4D is a section view of the prior art boost valve of FIG. 4B.
Figure 5:
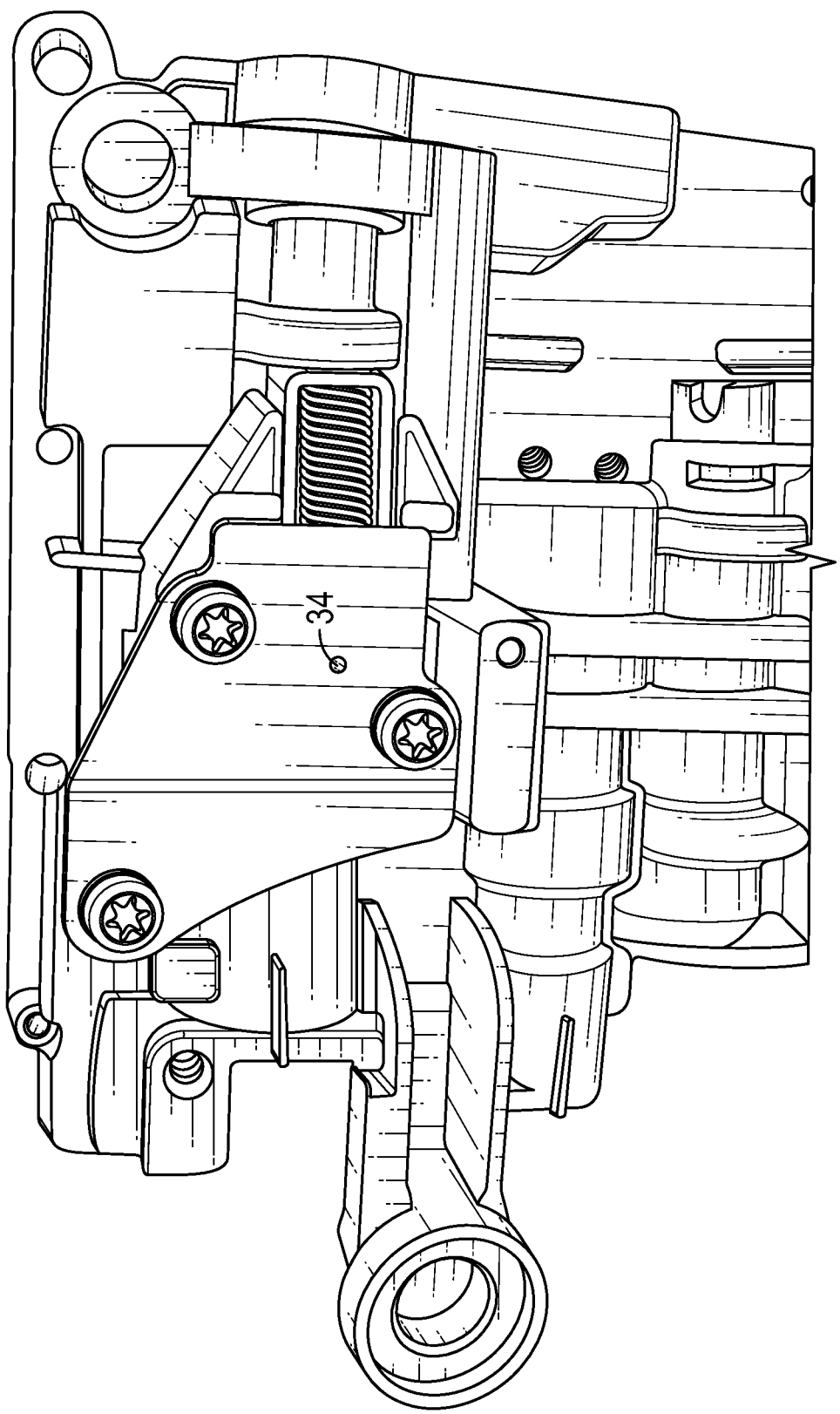
FIG. 5 shows the cover plate for the boost valve on the transmission casing.
Figure 8A:
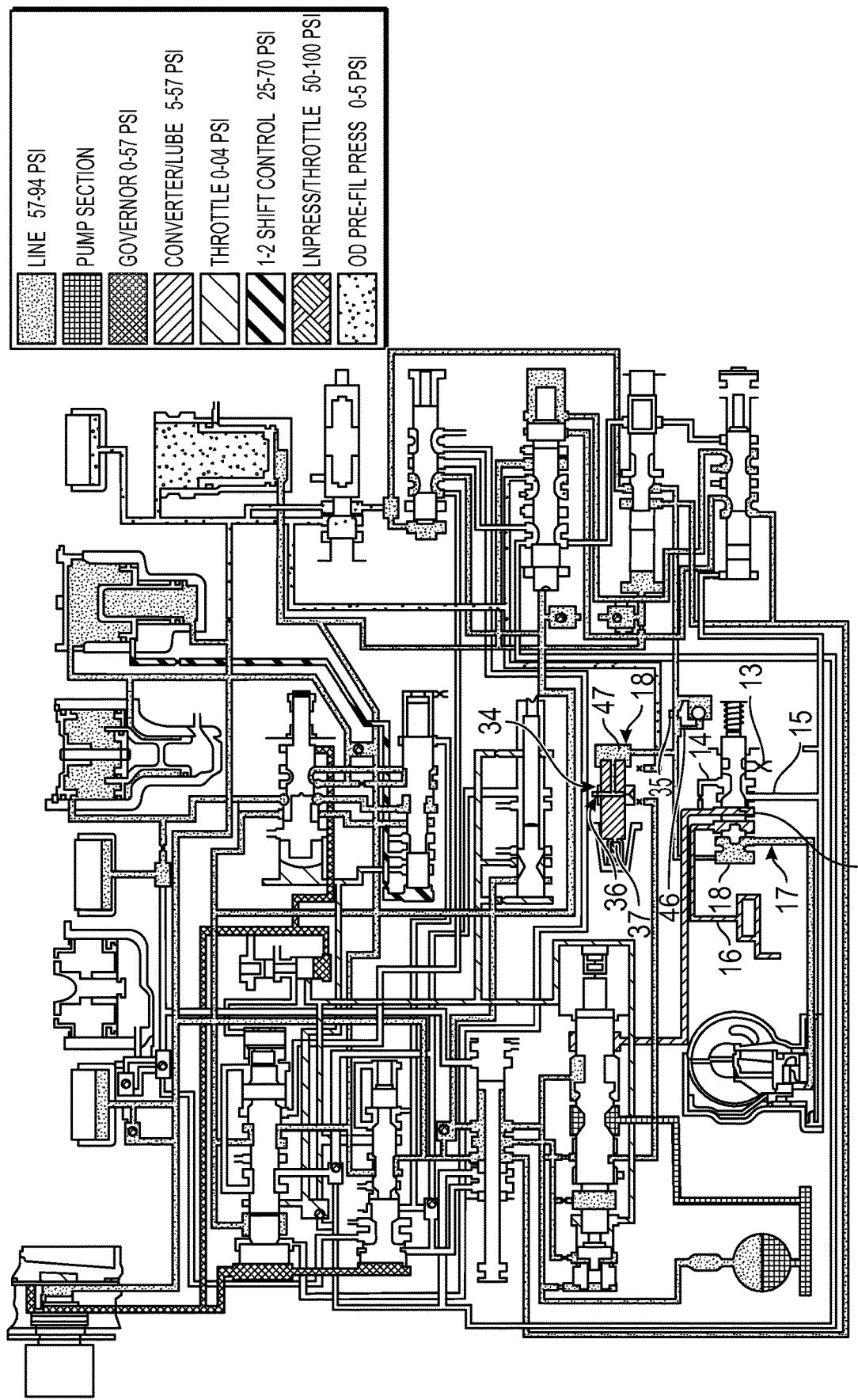
FIG. 8A is a schematic showing the oil flow circuit according to Applicant's invention, in a locked condition.
Figure 8B:
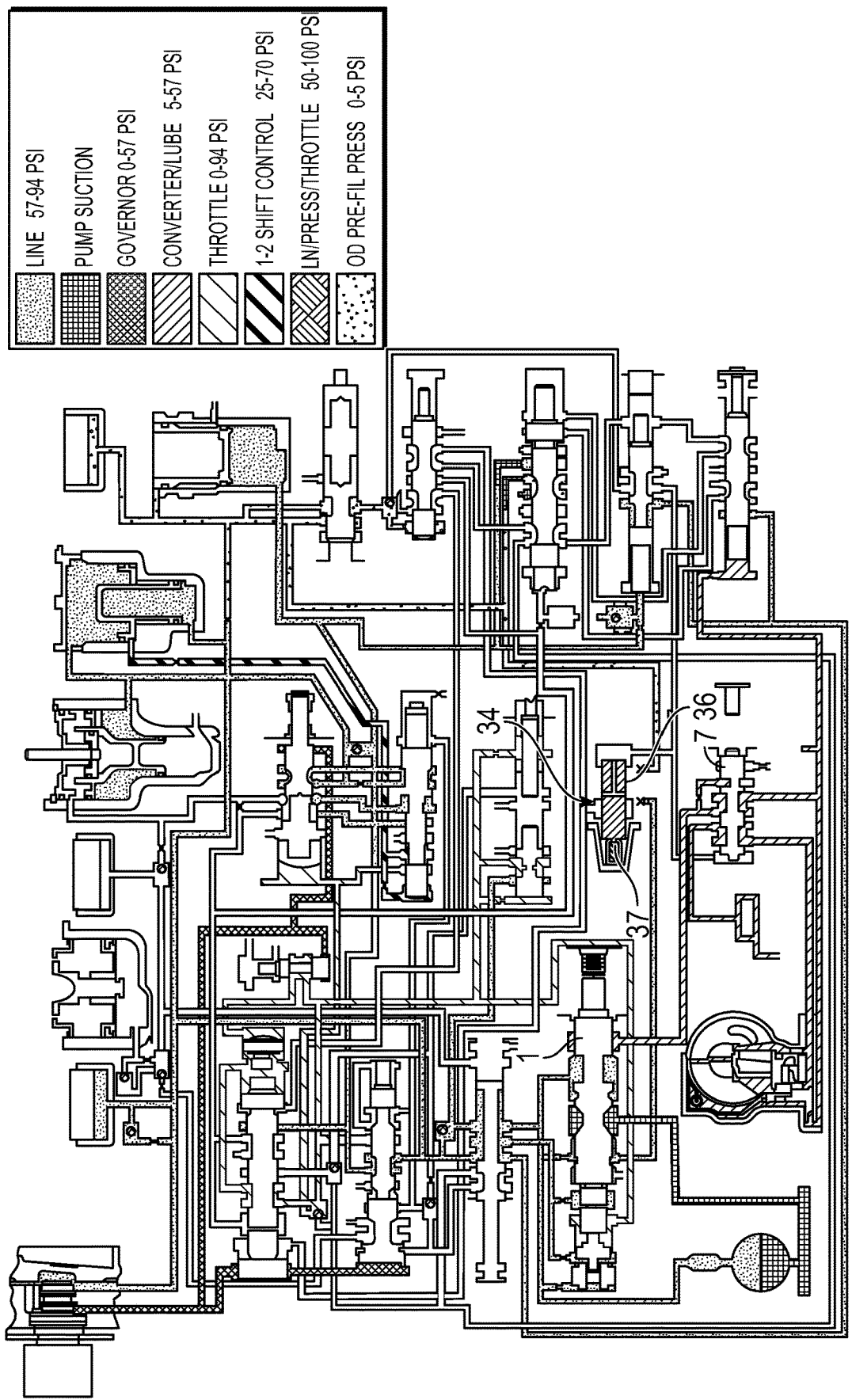
FIG. 8B is a schematic showing the oil flow circuit of the invention in an unlocked condition.
Figure 10:
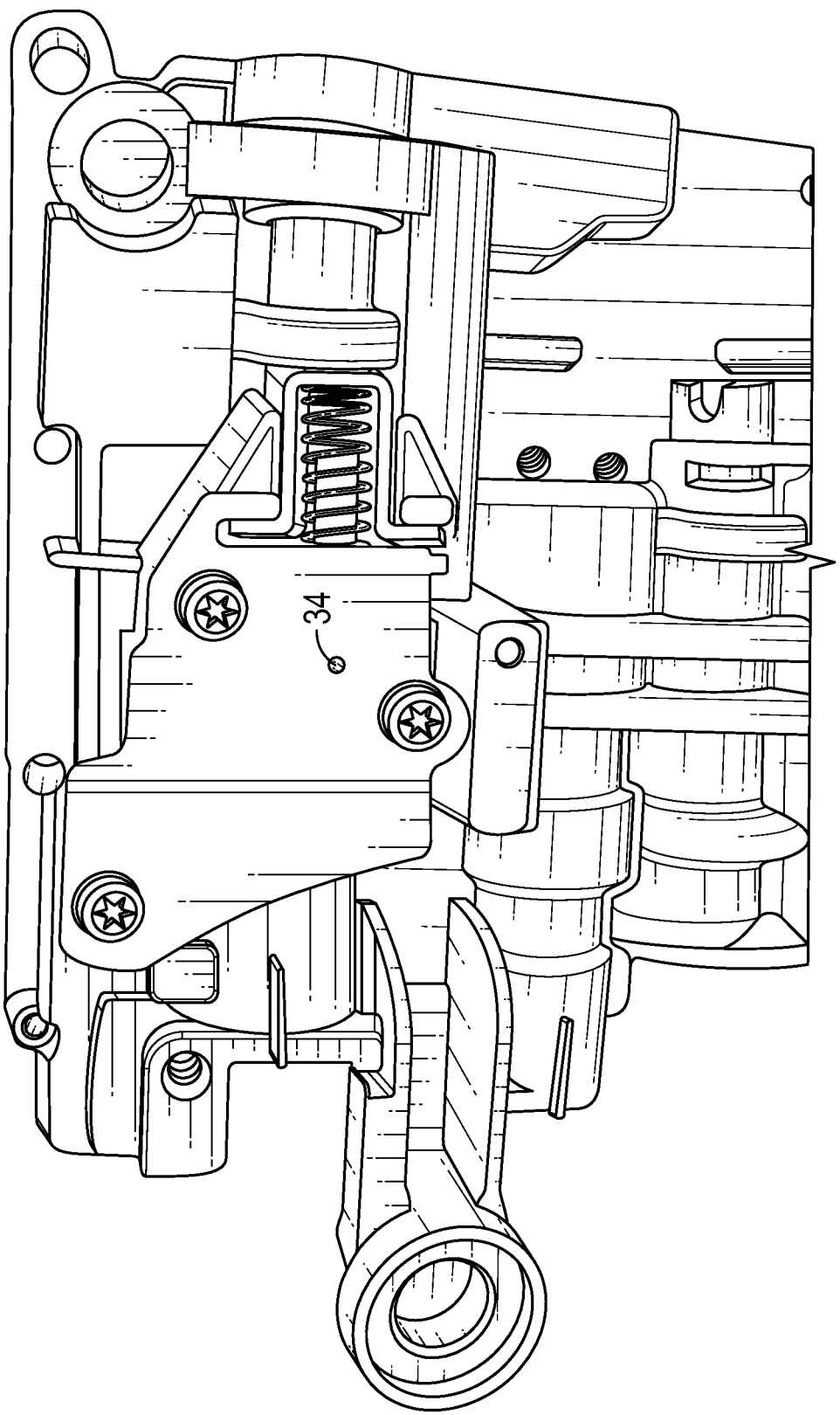
FIG. 10 shows Applicant's pressure regulating valve with the torque converter clutch off or disengaged.

The regulator valve 36 regulates pressure by directing oil in circuit 18 (FIGS. 3 and 8A) through the orifice 35 and then to valve 36 so as to act on area 47 (FIGS. 4A and 8A). This oil pressure strokes valve 36 against the spring 37 and exhausts pressure in circuit 18 out the exhaust orifice 34 (FIGS. 8A and 10).

Figure 1:
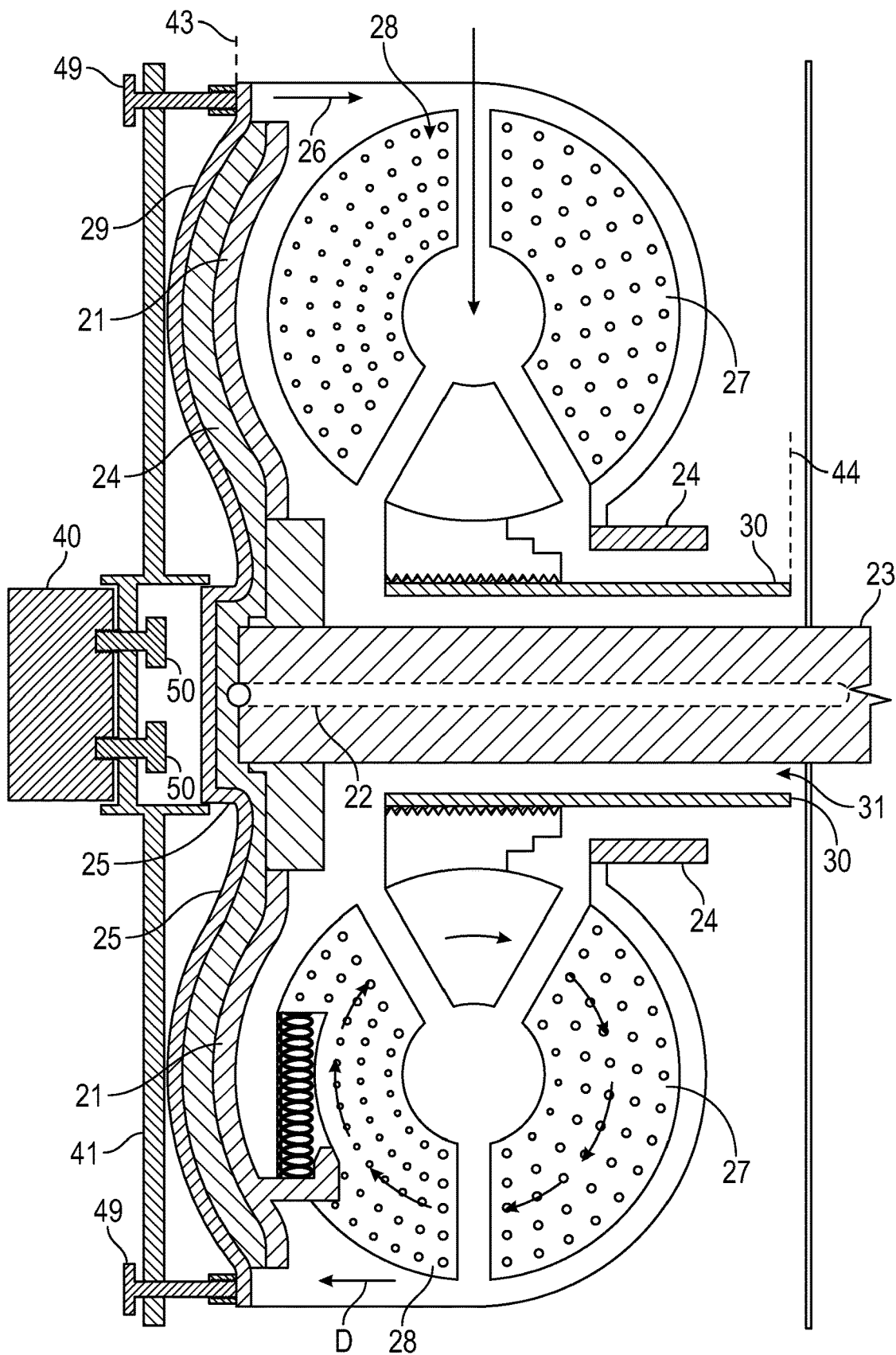
FIG. 1 is a sectional view showing the components of a torque converter (TC) with a lock up clutch, according to the present invention.
Figure 2:
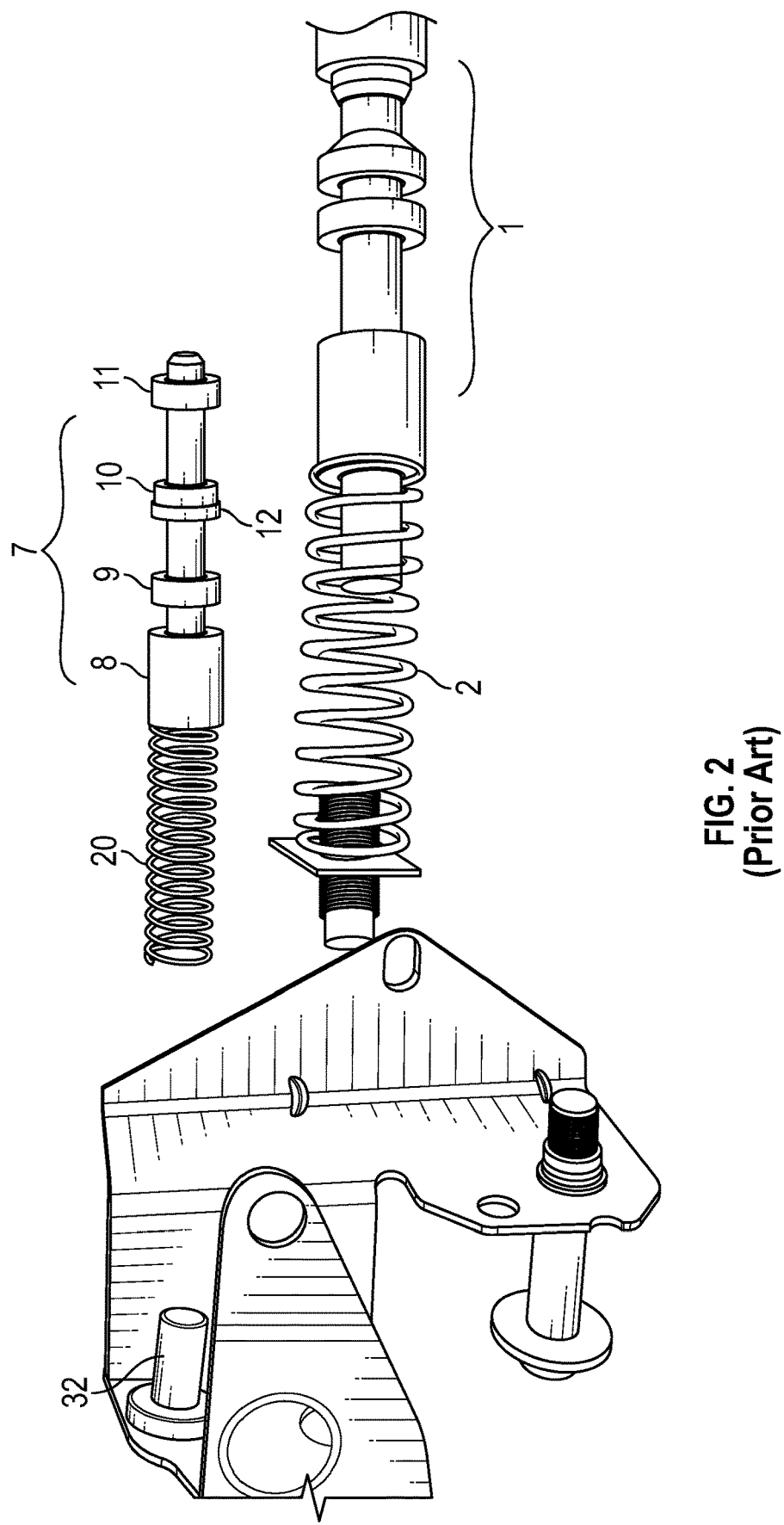
FIG. 2 is a photograph showing the prior art switch valve, pressure regulating valve, and springs for the automatic transmission circuitry.

With the TCAR valve 36 system, the overdrive circuit 45 is blocked by the new separator plate. Oil passage 42 is blocked by the valve 36. The TCAR valve 36 is a regulator valve. Regulator valves are used to control pressure in an oil circuit. The TCAR valve 36 serves a similar function to torque converter relief valves used in some other types of automatic transmissions. The valve 36 with its oil passages 18, 48 replaces the solid boost valve 33 of the prior art. When the lockup valve 39 is stroked to the ON position, the beginning of the torque converter apply circuit 18 is supplied unrestricted flow of line pressure via lockup valve 39. This pressure then flows through orifice 35 in the separator plate 51 and closes the one-way check ball valve 46 over the hole in the separator plate 51 that resides next to orifice 35. The restricted oil from the orifice then flows to the base of the switch valve 7 and base area 47 of valve 36 via a passage through the valve body casting. Switch valve 7 is stroked, opening area 24 (FIG. 1) within the TC to exhaust, via passage 22 (FIG. 1) through the input shaft 23 (FIG. 1). Simultaneously the oil pressure that strokes switch valve 7 travels through area 31 (FIG. 1) pressurizing the TC applying lock up piston 21 (FIG. 1). As the oil pressure increases in the TC apply circuit 18 during this time, it acts on area 47 of the apply regulator valve 36, when this pressure exceeds the force of spring 37, valve 36 moves, opening oil passage 18, 48 to exhaust orifice 34. This action allows pressures exceeding the force of spring 37 to exit the valve body thereby lowering the pressure in the TC apply circuit 18 because the supplied flow has been restricted by orifice 35. This continuous action is known as regulation. If the size of exhaust orifice 34 is equal to or greater than supply orifice 35 then the regulated pressure is determined solely by the force of spring 37. If greater pressure is desired, the size of exhaust orifice 34 may be made smaller only exhausting a portion of the supplied oil. This allows pressures to be set differently according to the application.

In FIG. 9, restricted line pressure comes from the bottom of the switch valve 7. When the line pressure overcomes the force of spring 37, the valve 36 moves to open the oil passage through its bores 18, 48 to the exhaust port 34 in the cover plate. The regulated TCC apply pressure is determined by the force of spring 37 and the exhaust orifice 34 size.

In the prior art and the new invention, the exhaust orifice 34 does nothing while the TCC is off (with the exception of the prior art when overdrive is on while the TCC is off). In the prior art, the exhaust orifice 34 is a pressure bleed from the pressure reducing circuit 42 causing line pressure to boost when the TCC is on. In the new invention the exhaust orifice is the exhaust for the TCAR valve 36, and the orifice size can be used to set the desired pressure in the TC apply circuit when the TCC is in the ON position.

Figure 13A:
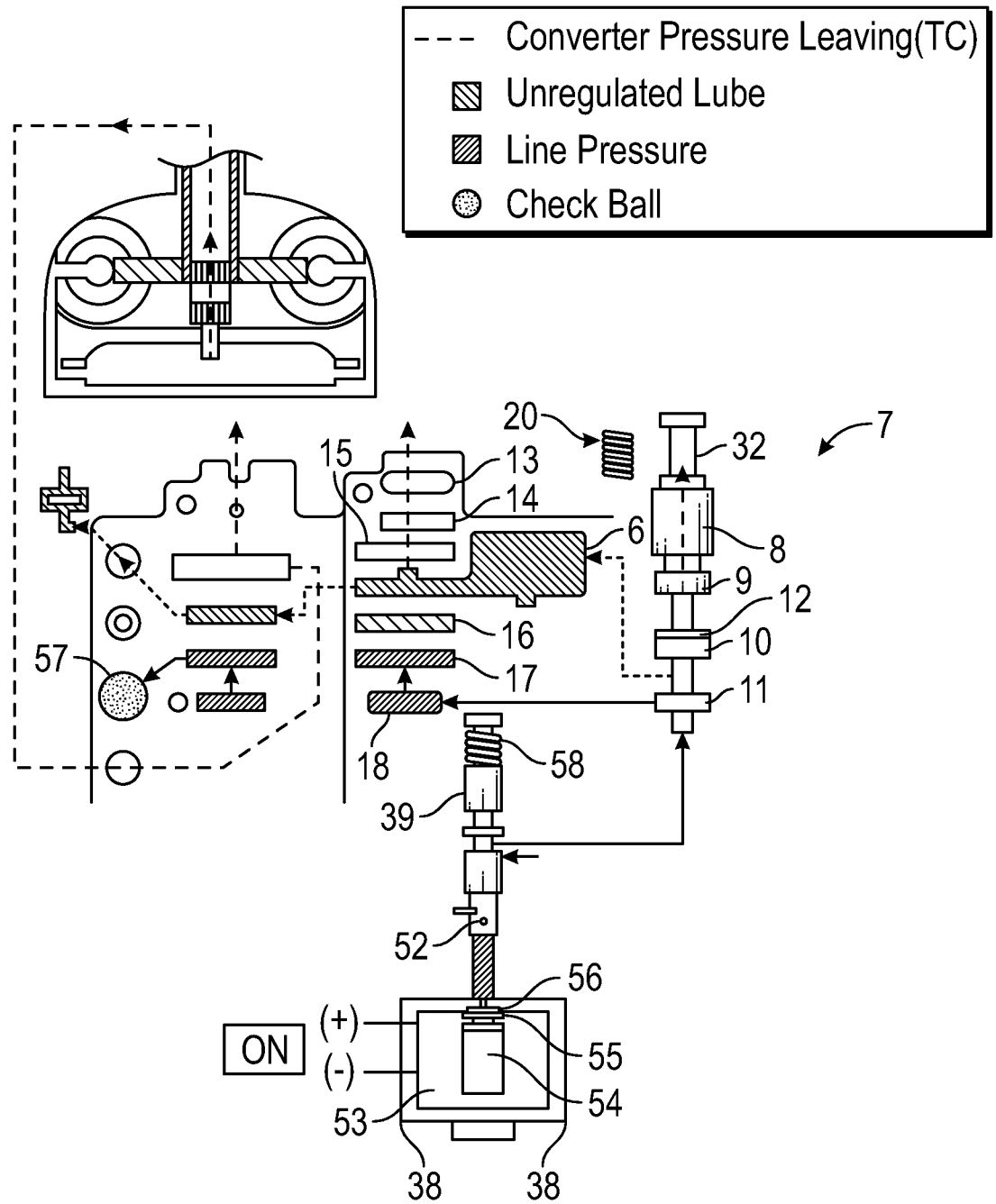
FIG. 13A is a sketch a torque converter drain dump valve, without a lockup clutch, with the solenoid "ON," according to the present invention
Figure 13B:
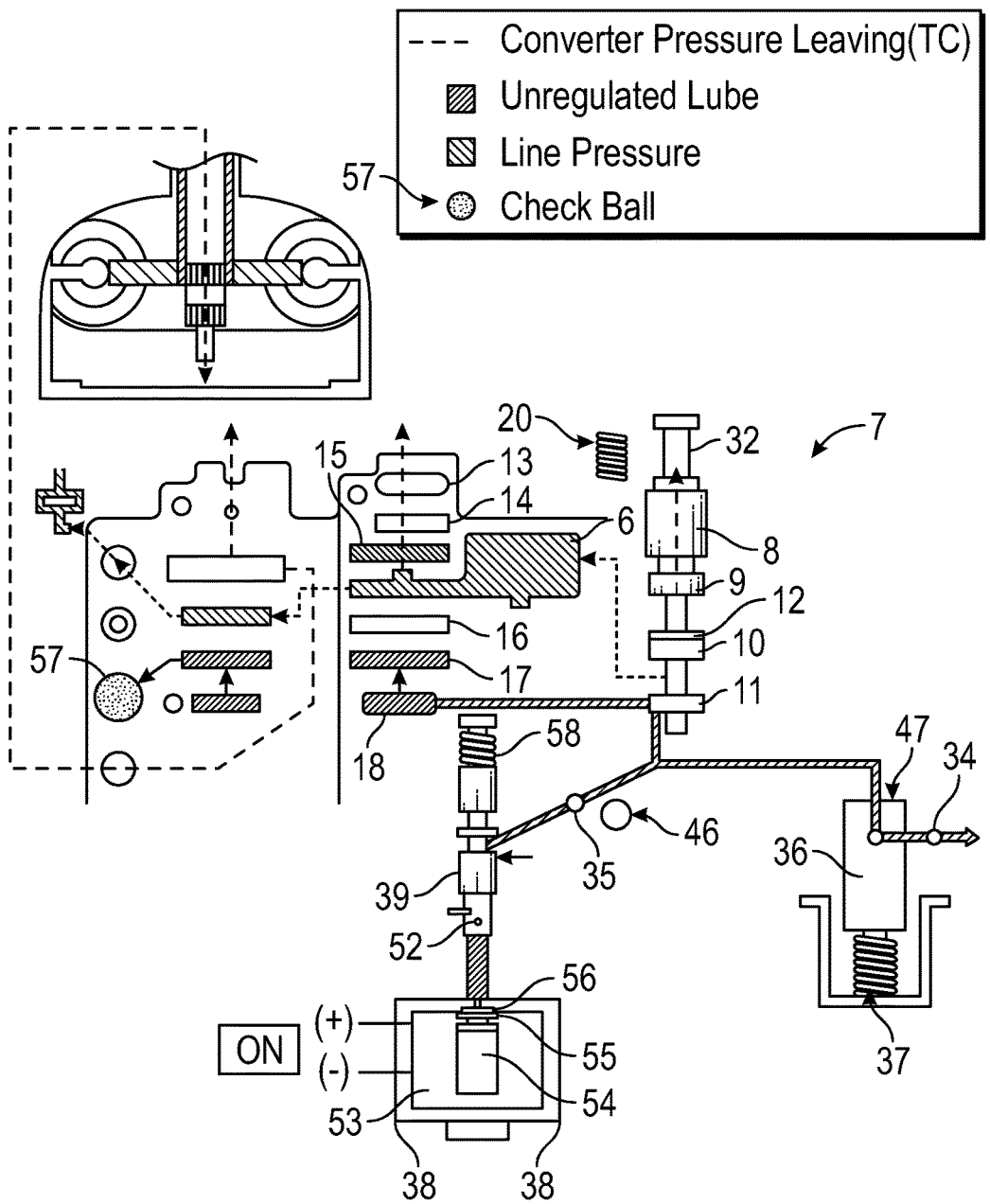
FIG. 13B is a sketch of the apply regulator valve for a torque converter without a lockup clutch, with the solenoid "ON."
Figure 14A:
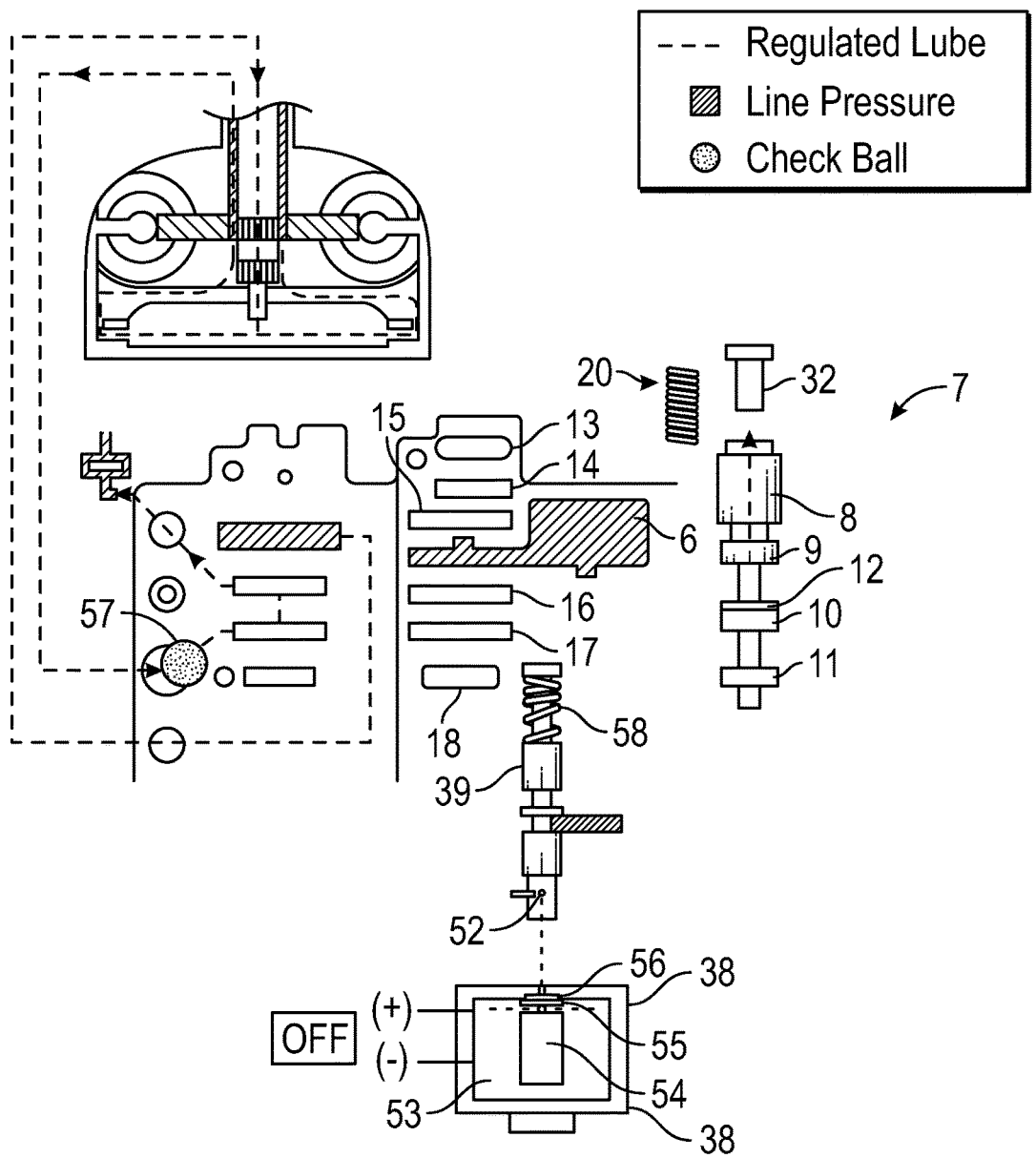
FIG. 14A is a view similar to FIG. 13A, with the solenoid "OFF."

In auto racing, it is often desired to increase the engine K-factor. Applicant's application Ser. No. 15/832,234, which is incorporated here in reference in its entirety, describes an adjustable stator for adjusting the K-factor. Another option for increasing the K-factor is to starve the torque converter of oil. FIGS. 22 and 23 illustrate an embodiment for a torque converter without a clutch wherein a check valve or ball, which when seated starves the converter of oil. The oil drains from the torque converter through the input shaft, as shown by the oil flow path of FIG. 13A, and out the valve body. A DC solenoid controls the oil filling or draining of the torque converter. FIG. 14A shows the torque converter being charged or filled with oil through the input shaft, which unseats the check valve to permit oil flow.

Torque Converter Drain (Dump Valve)

This paragraph is a description of the condition of the prior art lockup solenoid and valve system being "OFF" as it pertains to FIGS. to 11-14. This operation is the same for all; it will be referred to as "solenoid off" going forward. The base diameter of the lock up valve 39 is supplied with line pressure oil through a very small orifice 52 within the valve body 36. This orifice 52 leads to an exit from the valve body that is covered by a direct current lock up solenoid assembly 38. This solenoid consists of a coil of wire 53 with positive and negative external connections allowing it to be operated.

The coil encompasses a steel cylinder 54 that slides freely within the coil 53. Under the steel cylinder is a steel ball 55 that is partially contained within a cupped steel seat 56 with a hole through the center. This hole is lined up with the previously mentioned oil passage exiting the valve body 36 from the base of the lock up valve 39. When the solenoid 38 is not energized, the oil exits the valve body through the hole in the solenoid seat 56 and the steal ball 55 moves out of the way. The exit hole in seat 56 is much larger than the feed orifice 52 so not enough pressure is retained within the cavity to stroke the lock up valve 39 against its spring 58. When the lockup valve 39 is not stroked, torque converter apply circuit 18 is open to exhaust i.e. no pressure or flow within the circuit.

This paragraph is a description of the condition of the prior art lockup solenoid and valve system being "ON" as it pertains to FIGS. to 11-14. This operation is the same for all; it will be referred to as "solenoid on" going forward.

When the solenoid 38 is energized, the coil of wire 53 creates an electromagnet which subsequently causes the attraction of the internal steel parts of the solenoid, i.e. cylinder 54 to ball 55 and ball to seat 56. The ball 55 covers the hole in the seat 56 that was formerly is exhausting the oil, allowing pressure to build within the cavity, thereby stroking the lockup valve 39 against its spring 58. When the lockup valve 39 is stroked to the "ON" position, the torque converter apply circuit 18 is supplied unrestricted flow of line pressure via the passage opened by lockup valve 39.

Figure 12A:
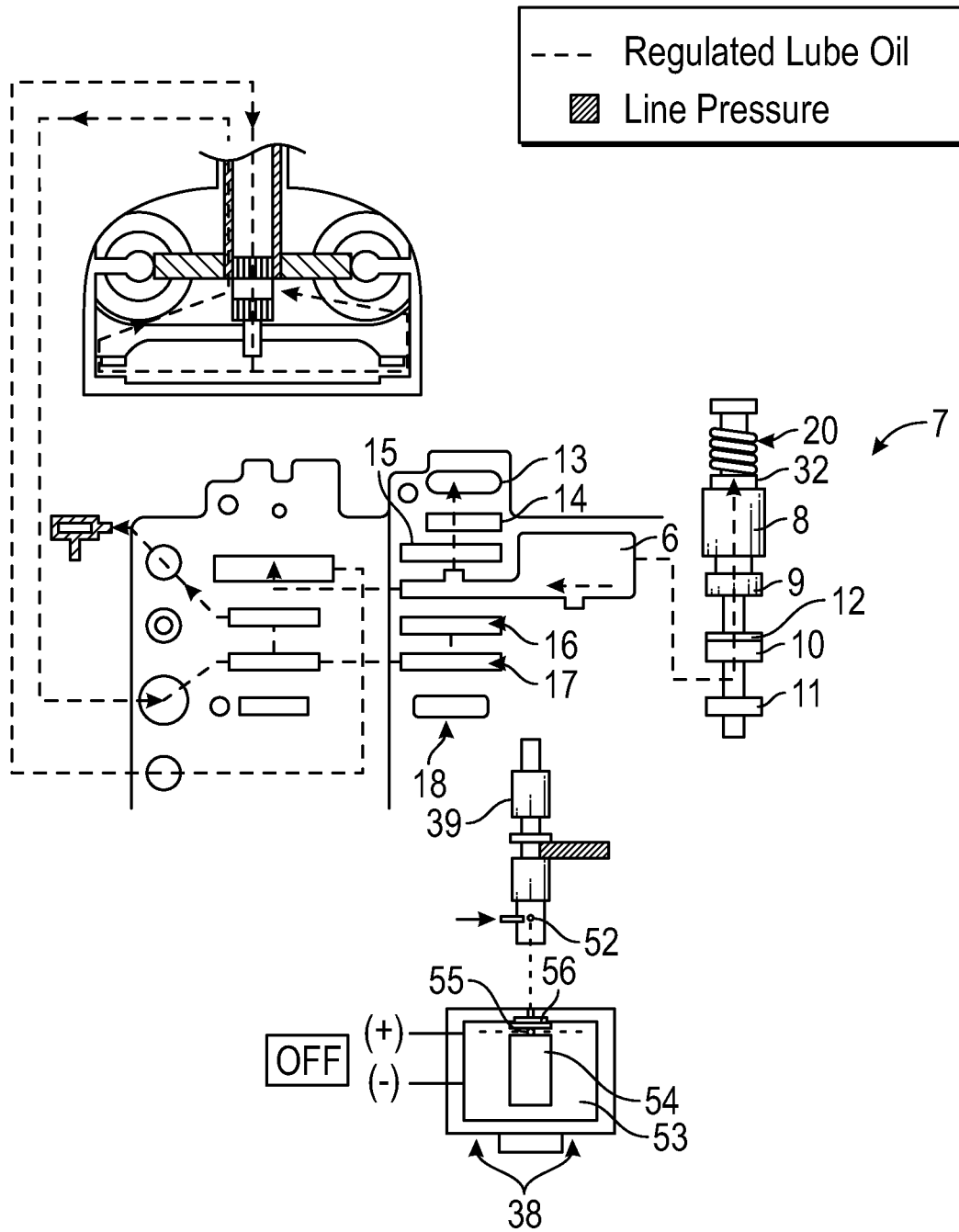
FIG. 12A is a sketch similar to FIG. 11A, with the solenoid "OFF."
Figure 12B:
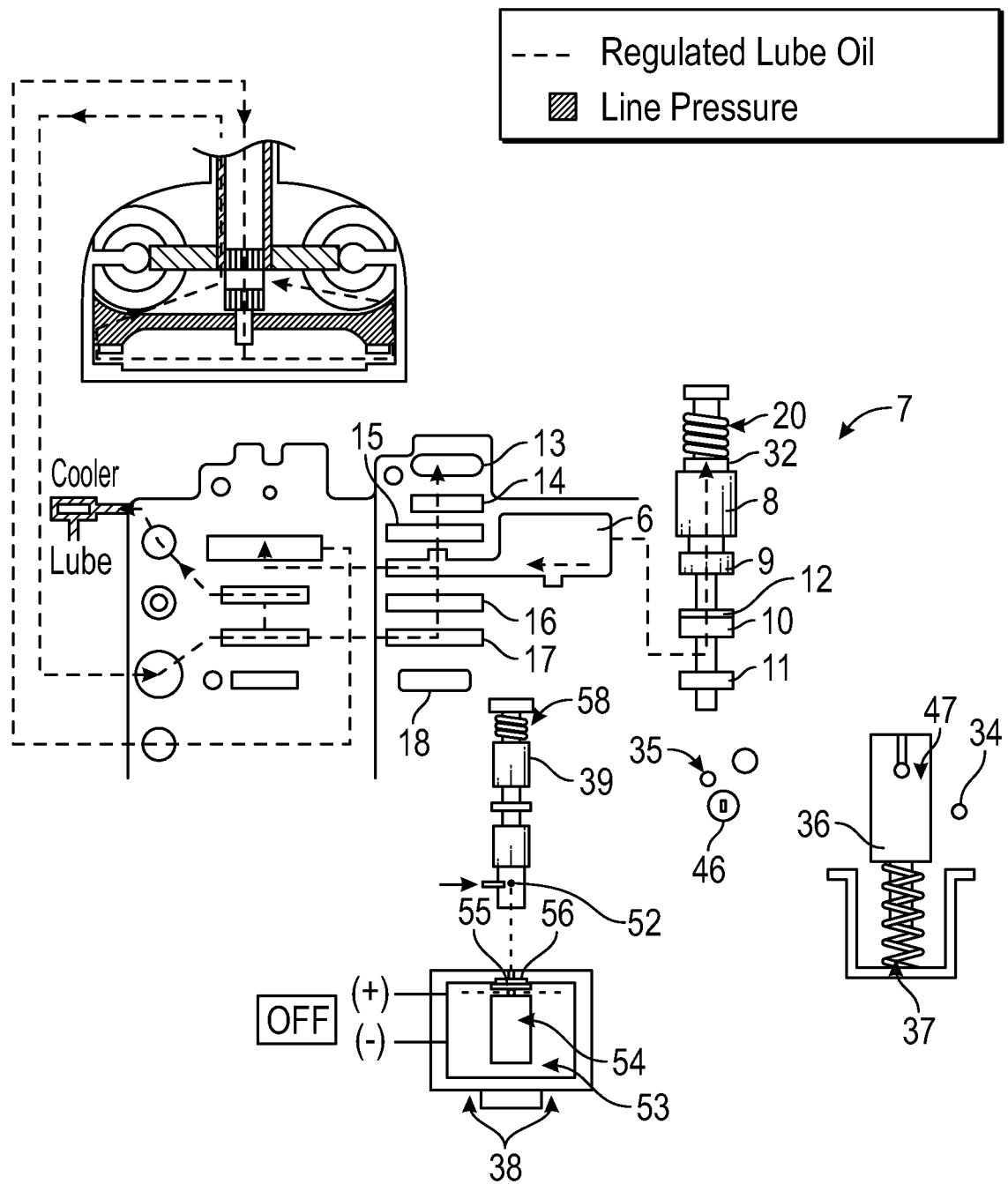
FIG. 12B is a sketch similar to FIG. 11B with the solenoid "OFF."

FIG. 12A shows the prior art system with the "solenoid off". Line pressure is blocked by the lockup valve 39 and circuit 18 is open to exhaust. The switch valve 7 is serving its regulating function as previously described on Page 2. Regulated Torque converter charge/lubrication pressure enters the TC through passage 22 (FIG. 1). This oil circulates through the TC providing a means for which to transfer motion from the impeller 27 to the turbine 28. This process creates heat due to the power losses of the oil, so the oil is able to exit the TC through area 23 then back to a different passage of the switch valve 7 and on to the oil cooler, transmission lubrication, and finally back to the pan where the oil starts the recirculation process again. This "solenoid off" Torque converter oil flow is the same for FIGS. 12A, 12B, 14A, and 14B and for lockup and non-lock torque converters alike.

Figure 11A:
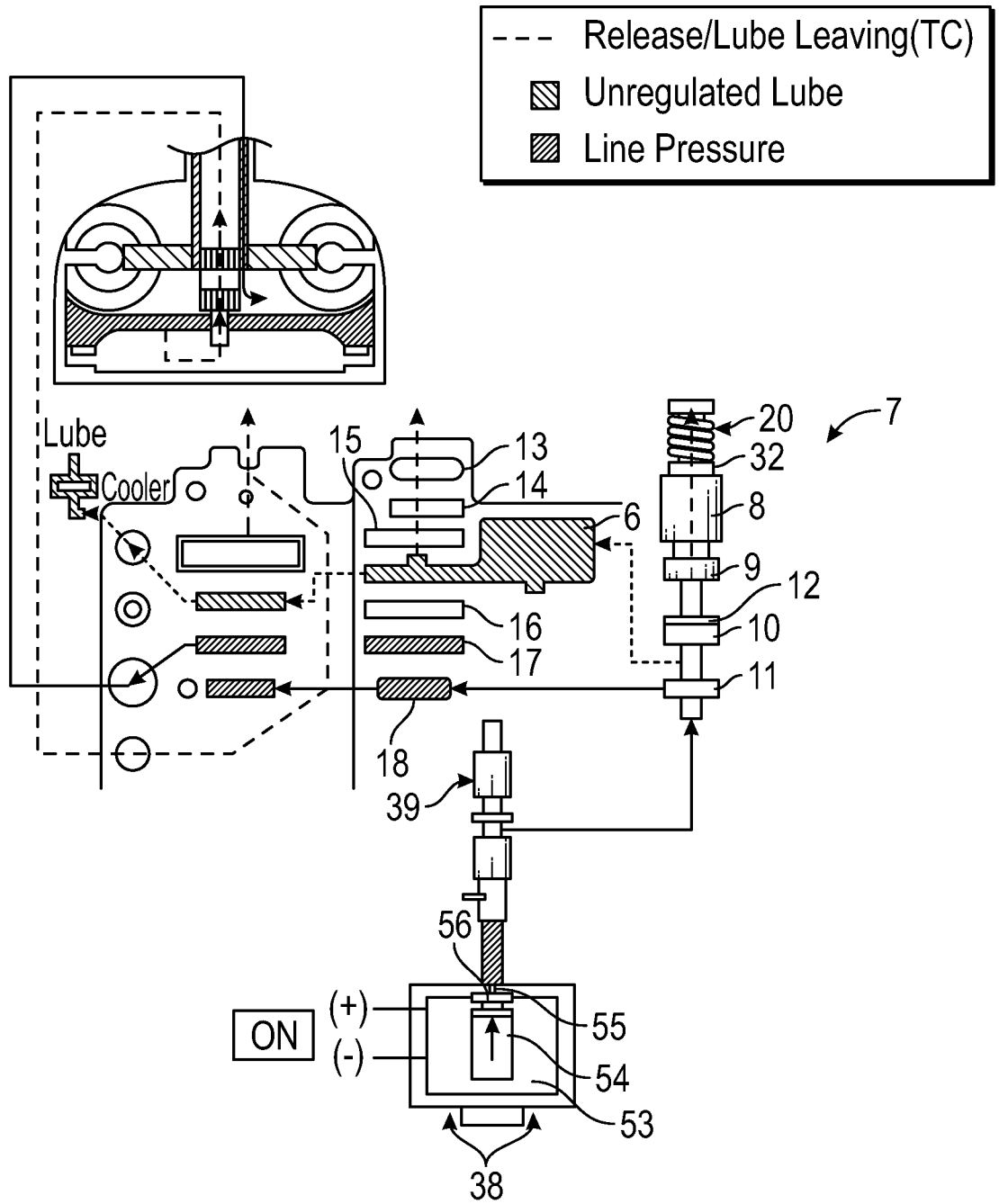
FIG. 11A is a sketch of a prior art torque converter with a clutch, and the solenoid in the "ON" position.
Figure 11B:
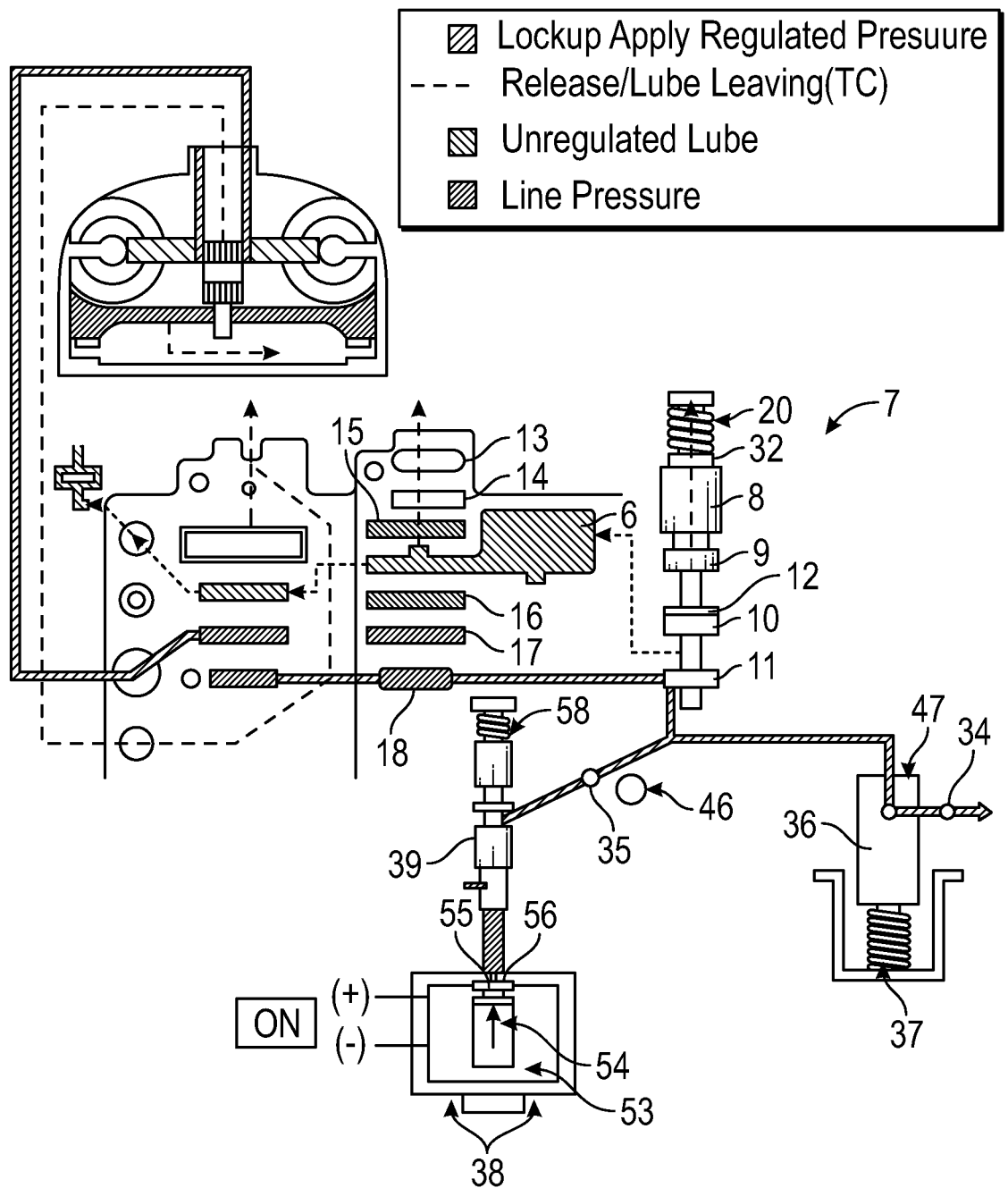
FIG. 11B is a sketch of the apply regulator valve of the present invention for a TC with a lockup clutch, and the solenoid in the "ON" position.

FIG. 11A shows the prior art system with the "solenoid on". Line pressure is supplied from the lockup valve 39 into TC apply circuit 18 which strokes the switch valve 7 to the TC "ON" position the oil travels on to area 31 pressurizing the TC and applying the clutch piston 21 within. In the previous art when the torque converter is locked, the cooler and torque converter fluid circuits are isolated, such that the pressure is unregulated, which can lead to excessive internal pressure and ballooning of the torque converter walls. When the torque converter is unlocked, the circuits are coupled, so as to regulate the pressure to approximately 135 psi, maximum, to prevent ballooning of the torque converter housing. FIG. 11B shows a system consisting of torque converter with a lockup clutch, in the "solenoid on" position with the addition of the lockup apply regulator valve 36 and its other applicable components. Hereby regulating the pressure in the torque converter to preventing ballooning damage and lowering the force exerted on the switch valve 7 preventing damage to switch valve stop 32.

FIGS. 13A, 13B, 14A and 14B show a Torque Converter Drain (Dump Valve) system in which a special non-lockup torque converter is used where the lockup clutch and piston 21 (FIG. 1) are removed.

Figure 14B:
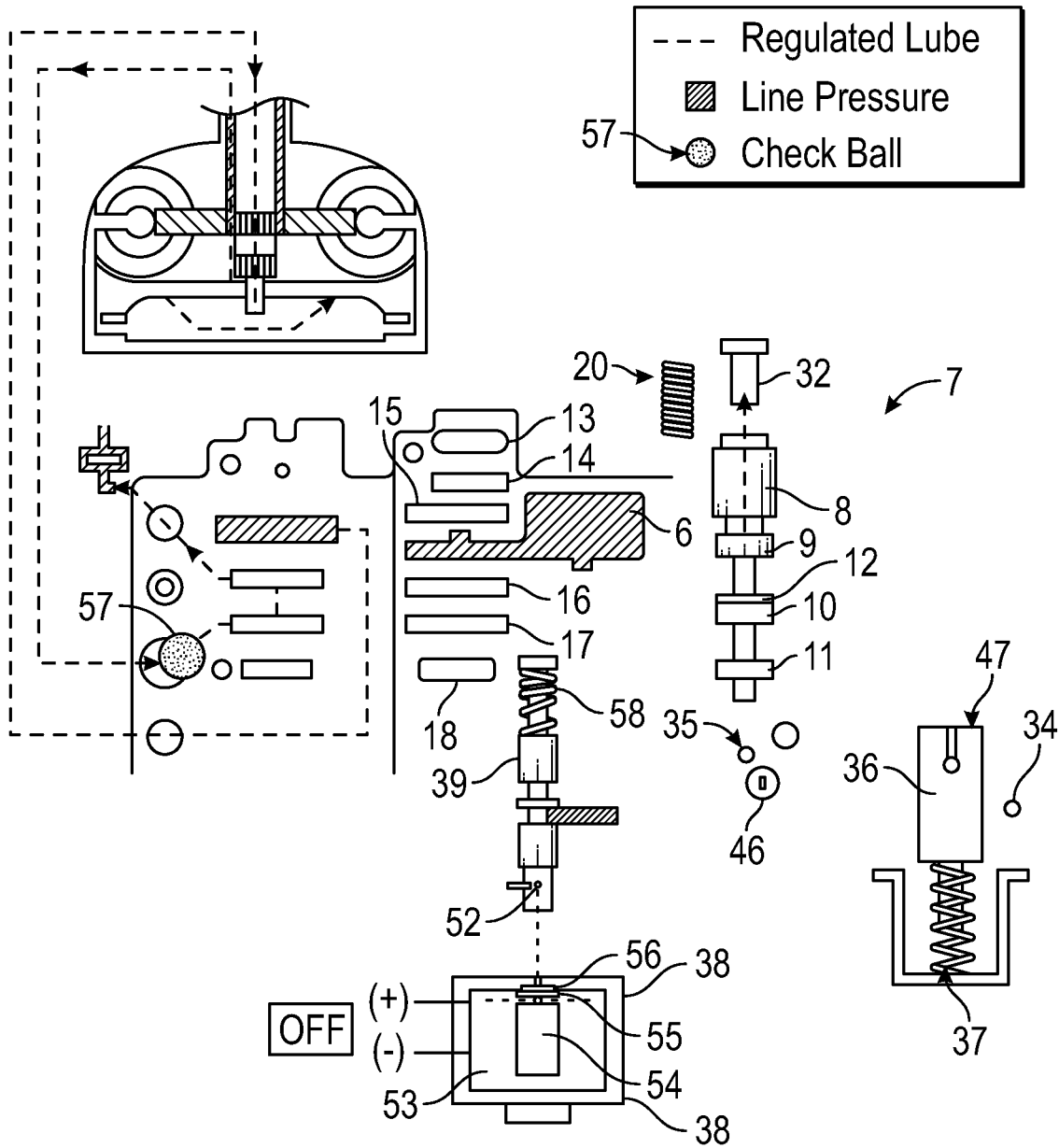
FIG. 14B is a sketch similar to FIG. 13B, with the solenoid "OFF."

The previously described "solenoid on" sequence happens in the same manner until the apply oil in circuit 18 is blocked before it may enter the TC through area 31 (FIG. 1) by a one-way check ball (valve) 57 that is an addition specific to this system. The switch valve 7 is stroked and the torque converter is open to exhaust through passage 22 without being filled as it would be in a lockup application. As the oil pressure and ultimately oil volume decreases within the torque converter, there is less resistance against the engine, allowing RPM and "K" factor to increase. The "solenoid off" position works in the same manner as the conventional system since the one-way check ball (valve) 57 allows oil flowing from the TC to the go to the cooler and so-on. In this alternate embodiment the torque converter lock-up clutch has been eliminated, and the method normally used for lock-up has been repurposed to drain the oil from the torque converter thereby raising the K factor for racing applications. The Torque converter drain (dump valve) may be used in conjunction with the lockup apply regulator valve (FIGS. 13B and 14B) or as a stand-alone option (FIGS. 13A and 14B). When it is used with the lockup apply regulator valve system, the lock-up apply regulator valve 36 is used for regulating the pressure in circuit 18 to prevent damage to the switch valve stop 32.

PARTS LIST

| PART NAME | PART NUMBER | FIG. NO. |
| --- | --- | --- |
| Main Pressure Regulator Valve (PR) | 1 | 2 |
| Main Pressure Regulator Valve Spring (PR) | 2 | 2 |
| Main Line Pressure Cavity | 4 | 3 |
| Sump | 5 | 3 |
| "Other Cavity" - Torque Converter Charge Oil Cooler Transmission Lubrication Circuit | 6 | 3 |
| Switch Valve | 7 | 2, 3 |
| Switch Valve Lands | 8, 9, 10, 11, 12 | 2 |
| Torque Converter Oil Flow Circuits | 13, 14, 15, 16, 17, 18 | 3 |
| Switch Valve Compression Spring | 20 | 2 |
| Torque Converter Clutch Piston | 21 | 1 |
| Torque Converter Clutch Piston Release oil - center of input shaft | 22 | 1 |
| Input Shaft | 23 | 1 |
| Torque Converter Clutch Release Area | 24 | 1 |
| Impeller Hub | 19 | 1 |
| Torque Converter Cover | 25 | 1 |
| Released Position | 26 | 1 |
| Impeller (Drive Fan) | 27 | 1 |
| Turbine (Driven Fan) | 28 | 1 |
| Torque Converter Assembly | 29 | 1 |
| Transmission Stator Support | 30 | 1 |
| Area "31" | 31 | 1 |
| Switch Valve Stop | 32 | 2 |
| OE/Standard Line Pressure Boost Valve | 33 | 4B |
| Line Pressure Boost Exhaust Orifice | 34 | 5 |
| Feed Orifice on Apply | 35 | 6 |
| "New" TCC Apply Regulator Valve | 36 | 4A, 8A, 8B |
| "New" TCC Apply Regulator Valve Spring | 37 | 6 |
| Lock Up Solenoid | 38 | 11-14 |
| Lock Up Valve | 39 | 11-14 |
| Engine Crankshaft | 40 | 1 |
| Flex Plate | 41 | 1 |
| Pressure Reducing Circuit | 42 | 9A, 9B |
| Dashed Line | 43 | 1 |
| Dashed Line | 44 | 1 |
| Circuit | 45 | 9A, 9B |
| Check Ball | 46 | 6 |
| Area | 47 | 4A |

-continued

| PART NAME | PART NUMBER | FIG. NO. |
|---|---|---|
| Hole | 48 | 4A |
| Bolt | 49 | 1 |
| Bolt | 50 | 1 |
| Separator Plate | 51 | 6 |
| Orifice | 52 | 11-14 |
| Coil Wire | 53 | 11-14 |
| Steel Cylinder | 54 | 11-14 |
| Steel Ball | 55 | 11-14 |
| Check Ball | 57 | 11-14 |
| Lockup Valve Spring | 58 | 11-14 |

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. An improved automotive transmission having a valve body with oil flow circuitry and a torque converter in fluid communication with the oil flow circuitry, the improvement comprising;
    a pressure regulator valve in the valve body for controlling oil pressure within the torque converter and being movable between a first position and a second position;
    a spring to bias the regulator valve to the first position; and
    the pressure regulator valve having a hole for fluid communication with an exhaust in the circuitry when the valve is in the second position.

2. The valve body of claim 1 further comprising a check ball or check valve in the circuitry to control oil flow.

3. The valve body of claim 2 further comprising a separator plate with an orifice that is restricted when the check ball seats when a clutch of the torque converter is engaged, and which is unrestricted when the clutch is disengaged.

4. The torque converter valve body of claim 2 wherein the check ball or valve moves between open and closed positions.

5. A method of controlling oil pressure within a torque converter of an automatic transmission having a valve body with oil circuitry, comprising:
    directing oil through a hole in a pressure regulating valve to a line in the oil circuitry; and
    biasing the regulator valve to a first position with a spring.

6. The method of claim 5 further comprising directing oil flow in the circuitry with a check ball or valve.

7. The method of claim 6 further comprising seating the check ball or valve, directing oil through an orifice that is supplied to engage the torque converter clutch.

8. The method of claim 5 further comprising moving the regulator valve against the spring to a second position by oil pressure in the valve body/torque converter.

9. The method of claim 7 further comprising unseating the check ball or valve to disengage the torque converter.

* * * * *

UNITED STATES PATENT AND TRADEMARK OFFICE
CERTIFICATE OF CORRECTION

PATENT NO. : 11,105,419 B2
APPLICATION NO. : 16/516129
DATED : August 31, 2021
INVENTOR(S) : Weissenfluh Page 1 of 1

It is certified that error appears in the above-identified patent and that said Letters Patent is hereby corrected as shown below:

On the Title Page

Item (73) Assignee, Change "Goerend Transmission, Inc." to --Goerend Transmissions, Inc.--.

Signed and Sealed this
Nineteenth Day of August, 2025

Coke Morgan Stewart
*Acting Director of the United States Patent and Trademark Office*